United States Patent
Shiratori (10) Patent No.: US 9,463,785 B2
(45) Date of Patent: Oct. 11, 2016

(54) CONTROL APPARATUS FOR A HYBRID VEHICLE DRIVE SYSTEM

(71) Applicant: TOYOTA JIDOSHA KABUSHIKI KAISHA, Toyoya-shi, Aichi (JP)

(72) Inventor: Hirotaka Shiratori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/626,002

(22) Filed: Feb. 19, 2015

(65) Prior Publication Data

US 2015/0258978 A1   Sep. 17, 2015

(30) Foreign Application Priority Data

Mar. 14, 2014   (JP) .................................. 2014-052642

(51) Int. Cl.
| | |
|---|---|
| *B60W 10/12* | (2012.01) |
| *B60K 6/20* | (2007.10) |
| *B60W 10/06* | (2006.01) |
| *B60W 10/08* | (2006.01) |
| *B60K 6/365* | (2007.10) |

(Continued)

(52) U.S. Cl.
CPC ............. *B60W 10/06* (2013.01); *B60K 6/365* (2013.01); *B60K 6/387* (2013.01); *B60K 6/445* (2013.01); *B60W 10/08* (2013.01); *B60W 20/40* (2013.01); *B60K 6/20* (2013.01); *B60K 2006/381* (2013.01); *B60W 2510/081* (2013.01); *F16H 3/727* (2013.01); *F16H 3/728* (2013.01); *F16H 2200/2007* (2013.01); *F16H 2200/2041* (2013.01); *Y02T 10/6239* (2013.01); *Y02T 10/6286* (2013.01); *Y02T 10/6295* (2013.01); *Y02T 10/7077* (2013.01); *Y10S 903/911* (2013.01); *Y10S 903/93* (2013.01); *Y10T 477/24* (2015.01); *Y10T 477/26* (2015.01)

(58) Field of Classification Search
None
See application file for complete search history.

(56) References Cited

U.S. PATENT DOCUMENTS

| | | | |
|---|---|---|---|
| 7,566,288 B2 | 7/2009 | Tabata et al. | |
| 8,052,570 B2 | 11/2011 | Kumazaki et al. | |

(Continued)

FOREIGN PATENT DOCUMENTS

| | | |
|---|---|---|
| JP | 2005-199942 A | 7/2005 |
| JP | 2007-069632 A | 3/2007 |

(Continued)

OTHER PUBLICATIONS

May 12, 2015 Office Action issued in U.S. Appl. No. 14/635,463.

(Continued)

*Primary Examiner* — Colby M Hansen
(74) *Attorney, Agent, or Firm* — Oliff PLC (57) ABSTRACT

A control apparatus for a hybrid vehicle drive system, which uses electric energy stored in a battery and includes a drive mode switching portion configured to bring a clutch or a brake into an engaged state, for switching the drive system from an EV drive mode, in which a vehicle drive force is generated by at least one of first and second electric motors when a crankshaft of an engine is connected to a housing, to a constant-speed-ratio drive mode, in which the vehicle drive force is generated by at least one of the first and second electric motors when a ratio of an output speed of the drive system to a speed of a rotary motion received from the engine is constant, when an operating speed of the first or second electric motor is at or greater than a predetermined threshold value in the EV drive mode.

5 Claims, 6 Drawing Sheets

(51) Int. Cl.
  *B60K 6/387*  (2007.10)
  *B60K 6/445*  (2007.10)
  *B60W 20/00*  (2016.01)
  *F16H 3/72*  (2006.01)
  *B60K 6/38*  (2007.10)

(56) References Cited

U.S. PATENT DOCUMENTS

| | | |
|---|---|---|
| 8,303,447 B1 | 11/2012 | Kim et al. |
| 2006/0046886 A1 | 3/2006 | Holmes et al. |
| 2007/0063660 A1 | 3/2007 | Tabata et al. |
| 2007/0111848 A1 | 5/2007 | Tabata et al. |
| 2008/0182712 A1 | 7/2008 | Kira et al. |
| 2009/0275439 A1 | 11/2009 | Kersting |
| 2010/0203996 A1 | 8/2010 | Kawai et al. |
| 2010/0273596 A1 | 10/2010 | Seo et al. |
| 2010/0279817 A1 | 11/2010 | Holmes |
| 2011/0111906 A1* | 5/2011 | Kim ............... B60K 6/365 475/5 |
| 2011/0111909 A1 | 5/2011 | Kim et al. |
| 2011/0213525 A1 | 9/2011 | Kanemoto et al. |
| 2012/0052999 A1 | 3/2012 | Kim et al. |
| 2012/0116622 A1* | 5/2012 | Kim ............... F16H 3/728 701/22 |
| 2012/0234282 A1 | 9/2012 | Sakuma |
| 2014/0316631 A1 | 10/2014 | Hayashi et al. |
| 2014/0342865 A1 | 11/2014 | Hayashi et al. |
| 2015/0075475 A1 | 3/2015 | Kawada et al. |
| 2015/0258983 A1* | 9/2015 | Kimura ............... B60W 20/108 701/22 |
| 2015/0258985 A1* | 9/2015 | Kimura ............... B60W 20/40 701/22 |
| 2015/0266461 A1* | 9/2015 | Sahashi ............... B60W 10/02 477/5 |
| 2015/0336569 A1 | 11/2015 | Matsubara et al. |

FOREIGN PATENT DOCUMENTS

| | | |
|---|---|---|
| JP | 2009-073221 A | 4/2009 |
| JP | 2010-143364 A | 7/2010 |
| JP | 2011-098712 A | 5/2011 |
| JP | 2012-081792 A | 4/2012 |
| JP | 2012-140061 A | 7/2012 |
| KR | 20110050894 A | 5/2011 |
| KR | 2012-0136641 A | 12/2012 |
| WO | 2013/145101 A1 | 10/2013 |

OTHER PUBLICATIONS

Nov. 3, 2015 Notice of Allowance issued in U.S. Appl. No. 14/635,463.
Nov. 19, 2015 Office Action issued in U.S. Appl. No. 14/635,717.
Jul. 15, 2016 Office Action issued in U.S. Appl. No. 14/661,861.

* cited by examiner

|  | CL1 | CL2 | BK1 | BK2 |
|---|---|---|---|---|
| HV1 |  |  |  | ○ |
| HV2 |  | ○ |  |  |
| EV1 |  |  |  | ○ |
| EV2 |  | ○ |  | ○ |
| 1ST-SPEED | ○ |  |  | ○ |
| 2ND-SPEED |  |  | ○ | ○ |
| 3RD-SPEED | ○ | ○ |  |  |
| 4TH-SPEED |  | ○ | ○ |  |

CONTROL APPARATUS FOR A HYBRID VEHICLE DRIVE SYSTEM

CROSS REFERENCE TO RELATED APPLICATION

The present application claims the priority from Japanese Patent Application No. 2014-052642 filed on Mar. 14, 2014, the disclosure of which is herein incorporated by reference in its entirety.

BACKGROUND OF THE INVENTION

1. Field of the Invention

The present invention relates to an improvement of a control apparatus for a drive system of a hybrid vehicle.

2. Description of Related Art

There is known a hybrid vehicle drive system including: a differential device which comprises a first differential mechanism and a second differential mechanism and which comprises four rotary components; an engine, a first electric motor, a second electric motor and an output rotary member which are respectively connected to the four rotary components; and a plurality of coupling elements. JP-2011-98712 A1 discloses an example of a hybrid vehicle transmission system configured to switch the hybrid vehicle drive system to a selected one of a plurality of vehicle drive modes, according to a selected one of different combinations of operating states of the coupling elements.

In the prior art hybrid vehicle drive system described above, it is not possible to maintain an EV drive mode in which the hybrid vehicle is driven by a drive force generated by at least one of the first and second electric motors while an output shaft of the engine is connected to a stationary member, if an operating speed of the first or second electric motor has been raised to an upper limit, even when a sufficiently large amount of an electric energy is stored in a battery. In this case, the electric energy stored in the battery cannot be sufficiently utilized. This problem was first discovered by the present inventor in the process of an intensive study in an effort to improve the performance of the hybrid vehicle.

SUMMARY OF THE INVENTION

The present invention was made in view of the background art described above. It is therefore an object of the present invention to provide a control apparatus for a hybrid vehicle drive system, which permits sufficient utilization of the electric energy stored in the battery.

The object indicated above is achieved according to a first aspect of the present invention, which provides a control apparatus for a drive system of a hybrid vehicle including: a differential device which comprises a first differential mechanism and a second differential mechanism and which comprises four rotary components; an engine, a first electric motor, a second electric motor and an output rotary member which are respectively connected to the above-described four rotary components; and a coupling element which is placed in an engaged state to hold constant a ratio of an output speed of the above-described first or second differential mechanism to a speed of a rotary motion received from the above-described engine, the control apparatus comprising a chive mode switching portion configured to bring the above-described coupling element into the engaged state, for switching the above-described hybrid vehicle drive system from a first drive mode in which a drive force to drive the hybrid vehicle is generated by at least one of the above-described first and second electric motors while an output shaft of the above-described engine is connected to a stationary member of the hybrid vehicle, to a second drive mode in which the drive force to drive the hybrid vehicle is generated by at least one of the first and second electric motors while the ratio of the output speed of the first or second differential mechanism to the speed of the rotary motion received from the engine is held constant, when the operating speed of the above-described first or second electric motor has been raised to a predetermined threshold value in the above-described first drive mode.

In the control apparatus according to the first aspect of the invention described above, the drive mode switching portion brings the above-described coupling element into the engaged state, for switching the above-described hybrid vehicle drive system from the first drive mode in which the drive force to drive the hybrid vehicle is generated by at least one of the above-described first and second electric motors while the output shaft of the above-described engine is connected to the stationary member of the hybrid vehicle, to the second drive mode in which the drive force to drive the hybrid vehicle is generated by at least one of the first and second electric motors while the ratio of the output speed of the first or second differential mechanism to the speed of the rotary motion received from the engine is held constant, when the operating speed of the above-described first or second electric motor has been raised to the predetermined threshold value in the above-described first drive mode. According to this first aspect of the invention, the coupling element is brought into the engaged state to switch the drive system to the above-indicated second drive mode when the operating speed of the first or second electric motor has been raised to the threshold value or upper limit while a sufficiently large amount of an electric energy is stored in a battery. Therefore, a desired output speed of the drive system can be established at a relatively low value of the operating speed of the first or second electric motor, so that the electric energy stored in the battery can be sufficiently utilized. Namely, the present invention provides a control apparatus for a hybrid vehicle drive system, which control apparatus permits sufficient utilization of an electric energy stored in a battery.

In the hybrid vehicle drive system according to a second aspect of the invention, which is controlled by the control apparatus according to the first aspect of the invention, the above-described first differential mechanism comprises a first rotary element connected to the above-described first electric motor, a second rotary element connected to the above-described engine, and a third rotary element, while the above-described second differential mechanism comprises a first rotary element, a second rotary element and a third rotary element. Further, the third rotary element of the above-described first differential mechanism and the third rotary element of the above-described second differential mechanism are connected to each other, and the second rotary element of the above-described second differential mechanism is connected to the above-described output rotary member, while the third rotary element of the above-described second differential mechanism is connected to the above-described second electric motor. According to this second aspect of the invention, it is possible to sufficiently utilize the electric energy stored in the battery in the hybrid vehicle drive system which has a practical arrangement.

According to a third aspect of the invention, the hybrid vehicle drive system according to the second aspect of the invention is provided with the above-described coupling element in the form of a clutch configured to selectively connect the first and second rotary elements of the first differential mechanism to each other, or in the form of a brake configured to selectively connect the first rotary element of the first differential mechanism to the stationary member. According to this third aspect of the invention, it is possible to sufficiently utilize the electric energy stored in the battery in the hybrid vehicle drive system which has a practical arrangement.

DETAILED DESCRIPTION OF PREFERRED EMBODIMENTS

In the hybrid vehicle drive system to be controlled by the control apparatus according to the present invention, the differential device comprising the first differential mechanism and the second differential mechanism comprises the four rotary components when the above-described clutch disposed between a rotary element of the first differential mechanism and a rotary element of the second differential mechanisms is placed in an engaged state. Preferably, the differential device comprises the four rotary components when the clutch disposed between a second rotary element of the first differential mechanism and a first rotary element of the second differential mechanism is placed in the engaged state. In other words, the present invention is suitably applicable to a hybrid vehicle drive system including: a differential device comprising a first differential mechanism and a second differential mechanism and comprising four rotary components relative rotating speeds of which are represented along a vertical axis in a two-dimensional collinear chart in which relative gear ratios of the first and second differential mechanisms are taken along a horizontal axis; and an engine, a first electric motor, a second electric motor and an output rotary member which are respectively connected to said four rotary components, and wherein one of the four rotary components is constituted by a rotary element of the first differential mechanism and a rotary element of the second differential mechanism which are selectively connected to each other through a clutch, while one of the rotary elements of the first and second differential mechanisms which are selectively connected to each other through the clutch is selectively connected to a stationary member through a brake.

Referring to the drawings, a preferred embodiment of the present invention will be described in detail. It is to be understood that the drawings referred to below do not necessarily accurately represent ratios of dimensions of various elements.

Embodiment

Figure 1:
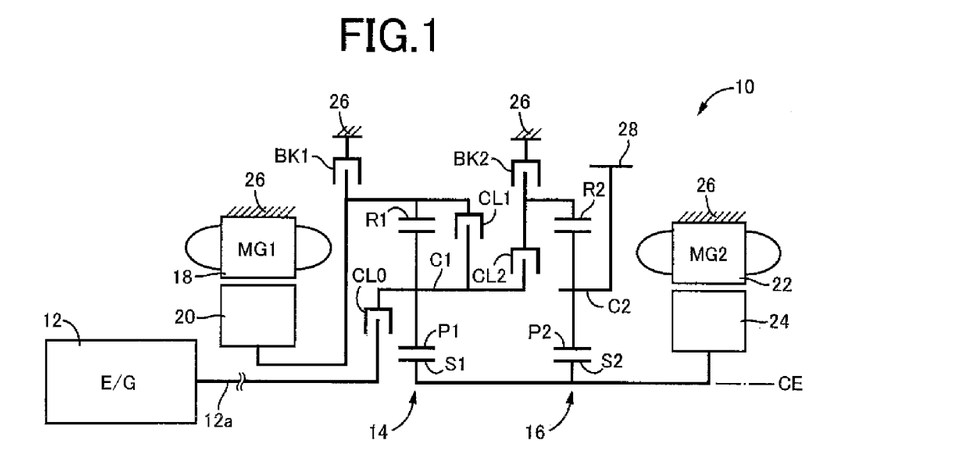
FIG. 1 is a schematic view showing an arrangement of a hybrid vehicle drive system to which the present invention is suitably applicable.

FIG. 1 is the schematic view showing an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common axis CE. In the following description of the embodiments, the direction of extension of this axis CE will be referred to as an "axial direction". The drive system 10 is constructed substantially symmetrically with respect to the axis CE. In FIG. 1, a lower half of the drive system 10 is not shown. This applies to the other figures showing the other embodiments.

The engine 12 is an internal combustion engine such as a gasoline engine, which is operable to generate a drive force by combustion of a fuel such as a gasoline injected into its cylinders. Each of the first and second electric motors MG1 and MG2 is a so-called motor/generator having a function of a motor operable to generate a drive force, and a function of an electric generator operable to generate a reaction force, and is provided with a stator 18, 22 connected to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which includes rotary elements consisting of: a first rotary element in the form of a ring gear R1; a second rotary element in the form of a carrier C1 supporting a pinion gear P1 such that the pinion gear P1 is rotatable about its axis and the axis of the planetary gear set; and a third rotary element in the form of a sun gear S1 meshing with the ring gear R1 through the pinion gear P1. The second planetary gear set 16 is a single-pinion type planetary gear set which has a gear ratio ρ2 and which includes rotary elements consisting of: a first rotary element in the form of a ring gear R2; a second rotary element in the form of a carrier C2 supporting a pinion gear P2 such that the pinion gear P2 is rotatable about its axis and the axis of the planetary gear set; and a third rotary element in the form of a sun gear S2 meshing with the ring gear R2 through the pinion gear P2.

In the first planetary gear set 14, the ring gear R1 is connected to the rotor 20 of the first electric motor MG1, and the carrier C1 is selectively connectable through a clutch CL0 to an output shaft of the engine 12 in the form of a crankshaft 12a, while the sun gear S1 is connected to the sun gear S2 of the second planetary gear set 16 and the rotor 24 of the second electric motor MG2. In the second planetary gear set 16, the carrier C2 is connected to an output rotary member in the form of an output gear 28. A drive force received by the output gear 28 is transmitted to a pair of right and left drive wheels (not shown) through a differential gear device and axles (not shown). A torque received by the drive wheels from a roadway surface during running of the hybrid vehicle is transmitted from the output gear 28 to the drive system 10 through the differential gear device and axles.

The clutch CL0 for selectively connecting and disconnecting the carrier C1 of the first planetary gear set 14 to and from the crankshaft 12a of the engine 12 is disposed between the crankshaft 12a and the carrier C1. A clutch CL1 for selectively connecting and disconnecting the carrier C1 to and from the ring gear R1 is disposed between the carrier C1 and the ring gear R1. A clutch CL2 for selectively connecting and disconnecting the carrier C1 to and from the ring gear R2 of the second planetary gear set 16 is disposed between the carrier C1 and the ring gear R2. A brake BK1 for selectively connecting the ring gear R1 to the stationary member in the form of the housing 26 is disposed between the ring gear R1 and the housing 26. A brake BK2 for selectively connecting the ring gear R2 to the housing 26 is disposed between the ring gear R2 and the housing 26.

Each of the clutches CL0, CL1 and CL2 (hereinafter collectively referred to as "clutches CL" unless otherwise specified), and the brakes BK1 and BK2 (hereinafter collectively referred to as "brakes BK" unless otherwise specified) is preferably a hydraulically operated coupling device the operating state of which is controlled (which is engaged and released) according to a hydraulic pressure applied thereto from a hydraulic control unit 54. While wet multiple-disc type hydraulically operated frictional coupling devices are preferably used as the clutches CL and brakes BK, meshing type coupling devices, namely, so-called dog clutches (claw clutches) may also be used. Alternatively, the clutches CL and brakes BK may be electromagnetic clutches, magnetic powder clutches and any other clutches the operating states of which are controlled (which are engaged and released) according to electric commands generated from an electronic control device 30.

In the drive system 10 constructed as described above, the carrier C1 and the ring gear R1 of the first planetary gear set 14 are connected to each other through the clutch CL1 placed in its engaged state, so that the rotary elements of the first planetary gear set 14 is rotated as a single unit when a rotary motion of the engine 12 is received by the first planetary gear set 14, whereby a ratio of the operating speed of the first planetary gear set 14 to the operating speed of the engine 12 is held constant. Further, the ring gear R1 of the first planetary gear set 14 is connected to the housing 26 through the brake BK1 placed in its engaged state, so that the ratio of the operating speed of the first planetary gear set 14 to the operating speed of the engine 12 is held constant. In other words, a differential function of the first planetary gear set 14 with respect to the rotary motion of the engine 12 is limited in the engaged state of the clutch CL1 or the brake BK1, so that a ratio of the output speed to the input speed of the first planetary gear set 14 is held constant at a predetermined value. Namely, each of the clutch CL1 and the brake BK1 in the present embodiment corresponds to a coupling element which is placed in the engaged state to hold constant the ratio of the output speed of the first planetary gear set 14 to the speed of the rotary motion received from the engine 12.

In the drive system 10, the differential device comprising the first and second planetary gear sets 14 and 16 comprises four rotary components when the clutch CL2 is placed in the engaged state. In other words, the drive system 10 includes: the differential device comprising the first planetary gear set 14 and the second planetary gear set 16 and comprising the four rotary components the relative rotating speeds of which are represented along a vertical axis in each of two-dimensional collinear charts of FIGS. 4-10 referred to below, in which the relative gear ratios of the first and second planetary gear sets 14 and 16 are taken along a horizontal axis; and the engine 12, the first electric motor MG1, the second electric motor MG2 and the output gear 28, which are respectively connected to the above-indicated four rotary components, and one of the four rotary components is constituted by the carrier C1 of the first planetary gear set 14 and the ring gear R2 of the second planetary gear set 16 which are selectively connected to each other through the clutch CL2, while the ring gear R2 selectively connected to the carrier C1 through the clutch CL2 is selectively connected to the housing 26 through the brake BK2.

In the present drive system 10, the clutch CL0 need not be provided. That is, the crankshaft 12a of the engine 12 may be connected to the carrier C1 of the first planetary gear set 14 through a damper, for example, without the clutch CL0 being disposed therebetween.

Figure 2:
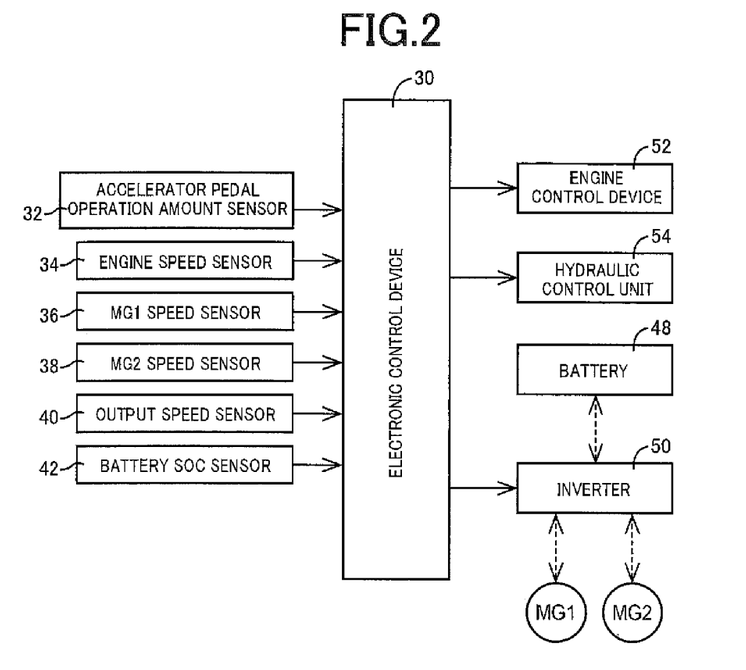
FIG. 2 is a block diagram illustrating major portions of a control system provided to control the drive system of FIG. 1.

FIG. 2 is the block diagram illustrating major portions of a control system provided to control the drive system 10. The electronic control device 30 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first and second electric motors MG1 and MG2. In the present embodiment, the electronic control device 30 serves as a control apparatus for the drive system 10. The electronic control device 30 may be constituted by mutually independent control units as needed for respective controls such as an output control of the engine 12 and drive controls of the first and second electric motors MG1 and MG2.

As indicated in FIG. 2, the electronic control device 30 is configured to receive various signals from sensors and switches provided in the drive system 10. Namely, the electronic control device 30 receives: an output signal of an accelerator pedal operation amount sensor 32 indicative of an operation amount or angle $A_{CC}$ of an accelerator pedal (not shown), which corresponds to a vehicle output required by a vehicle operator; an output signal of an engine speed sensor 34 indicative of an engine speed $N_E$, that is, an operating speed of the engine 12; an output signal of an MG1 speed sensor 36 indicative of an operating speed $N_{MG1}$ of the first electric motor MG1; an output signal of an MG2 speed sensor 38 indicative of an operating speed $N_{MG2}$ of the second electric motor MG2; an output signal of a running speed detector in the form of an output speed sensor 40 indicative of a rotating speed $N_{OUT}$ of the output gear 28, which corresponds to a running speed V of the hybrid vehicle; and an output signal of a battery SOC sensor 42 indicative of a stored electric energy amount (state of charge) SOC of a battery 48.

The electronic control device 30 is also configured to generate various control commands to be applied to various portions of the drive system 10. Namely, the electronic control device 30 applies, to an engine control device 52, engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 30 applies command signals to an inverter 50, for controlling operations of the first and second electric motors MG1 and MG2, so that the first and second electric motors MG1 and MG2 are operated with electric energies supplied thereto from the battery 48 through the inverter 50 according to the command signals to control outputs (output torques) of the electric motors MG1 and MG2. Electric energies generated by the first and second electric motors MG1 and MG2 are supplied to and stored in the battery 48 through the inverter 50. Further, the electronic control device 30 applies command signals for controlling the operating states of the clutches CL and brakes BK, to electromagnetic control valves provided in the hydraulic control unit 54, so that hydraulic pressures generated by those electromagnetic control valves are controlled to control the operating states of the clutches CL and brakes BK.

An operating state of the drive system 10 is controlled through the first and second electric motors MG1 and MG2, such that the drive system 10 functions as an electrically controlled differential portion whose difference of input and output speeds is controllable. For example, the electric energy generated by the first electric motor MG1 is supplied to the battery 48 or the second electric motor MG2 through the inverter 50. Namely, a major portion of the drive force of the engine 12 is mechanically transmitted to the output gear 28, while the remaining portion of the drive force is consumed by the first electric motor MG1 operating as the electric generator, and converted into the electric energy, which is supplied to the second electric motor MG2 through the inverter 50, so that the second electric motor MG2 is operated to generate a chive force to be transmitted to the output gear 28. Components associated with the generation of the electric energy and the consumption of the generated electric energy by the second electric motor MG2 constitute an electric path through which a portion of the drive force of the engine 12 is converted into an electric energy which is converted into a mechanical energy.

Figure 3:
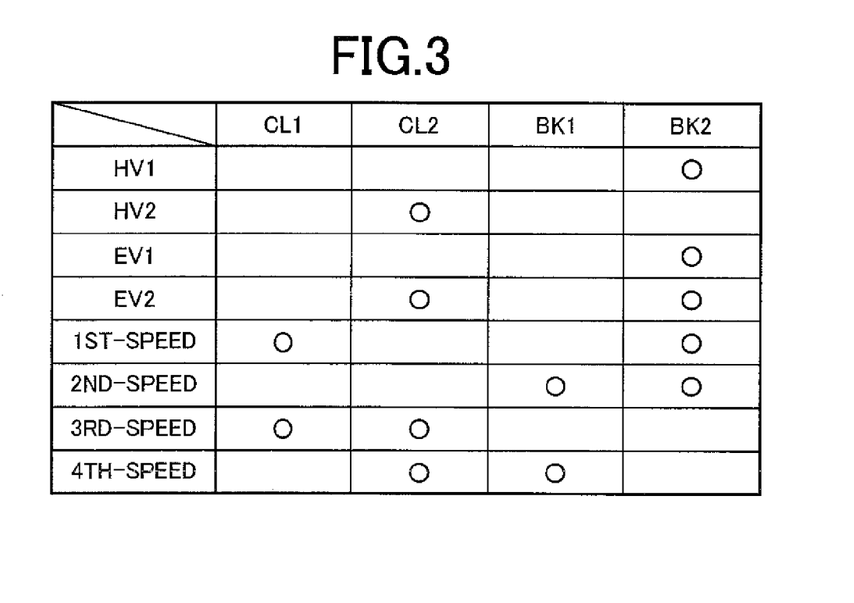
FIG. 3 is a table indicating combinations of operating states of clutches and brakes, which correspond to respective vehicle drive modes to be established in the drive system of FIG. 1.

In the hybrid vehicle provided with the drive system 10 constructed as described above, a selected one of a plurality of vehicle drive modes is established according to the operating states of the engine 12 and the first and second electric motors MG1 and MG2, and the operating states of the clutches CL and brakes BK. FIG. 3 is the table indicating combinations of the operating states of the clutches CL1 and CL2 and the brakes BK1 and BK2, which correspond to the respective eight vehicle drive modes of the drive system 10. In this table, "o" marks represent the engaged states of the clutches and brakes while blanks represent their released states. Drive modes HV1 and HV2 are hybrid drive modes in which the engine 12 is operated as the vehicle drive power source while the first and second electric motors MG1 and MG2 are operated as needed to generate a vehicle drive force and/or an electric energy. In these hybrid drive modes, at least one of the first and second electric motors MG1 and MG2 can be operated to generate a reaction force or placed in a non-loaded free state. Drive modes EV1 and EV2 are EV drive modes in which the engine 12 is held at rest while at least one of the first and second electric motors MG1 and MG2 is used as the vehicle drive power source. Drive modes "$1^{st}$-speed" through "$4^{th}$-speed" are constant-speed-ratio drive modes which are established when the differential functions of the first and second planetary gear sets 14 and 16 are limited, and in which the ratios of the output speeds of the first and second planetary gear sets 14 and 16 to the speed of the rotary motion received from the engine 12 are held constant.

In the drive system 10, the clutch CL1 and the brake BK1 are both placed in the released states, as indicated in FIG. 3, to permit the first planetary gear set 14 to perform the differential function with respect to the rotary motion received from the engine 12, in the hybrid drive modes in which the engine 12 is operated as the vehicle drive power source while the first and second electric motors MG1 and MG2 are operated as needed to generate a drive force and/or an electric energy. The hybrid drive mode HV1 is established when the brake BK2 is placed in the engaged state while the clutch CL2 is placed in the released state, and the hybrid drive mode HV2 is established when the brake BK2 is placed in the released state while the clutch CL2 is placed in the engaged state.

The clutch CL1 and the brake BK1 are both placed in the released states, to permit the first planetary gear set 14 to perform the differential function with respect to the rotary motion received from the engine 12, also in the EV drive modes in which at least one of the first and second electric motors MG1 and MG2 is operated as the vehicle drive power source while the engine 12 is held at rest. The EV drive mode EV1 is established when the brake BK2 is placed in the engaged state while the clutch CL2 is placed in the released state, and the EV drive mode EV2 is established when the brake BK2 and the clutch CL2 are both placed in the engaged states.

In the constant-speed-ratio drive modes in which ratios of the output speeds of the first and second planetary gear sets 14 and 16 to the speed of the rotary motion received from the engine 12 are held constant, either one of the clutch CL1 and the brake BK1 is placed in the engaged state to limit the differential function of the first planetary gear set 14 with respect to the rotary motion received from the engine 12. The constant-speed-ratio drive mode "$1^{st}$-speed" which is a first-speed drive mode having the highest speed ratio value is established when the clutch CL1 and the brake BK2 are placed in the engaged states while the clutch CL2 and the brake BK1 are placed in the released states. The constantspeed-ratio drive mode "$2^{nd}$-speed" which is a second-speed drive mode having a speed ratio value lower than that of the constant-speed-ratio drive mode "$1^{st}$-speed" is established when the clutches CL1 and CL2 are placed in the released states while the brakes BK1 and BK2 are placed in the engaged states. The constant-speed-ratio drive mode "$3^{rd}$-speed" which is a third-speed drive mode having a speed ratio value lower than that of the constant-speed-ratio drive mode "$2^{nd}$-speed" is established when the clutches CL1 and CL2 are placed in the engaged states while the brakes BK1 and BK2 are placed in the released states. The constant-speed-ratio drive mode "$4^{th}$-speed" which is a fourth-speed drive mode having the lowest speed ratio value is established when the clutch CL1 and the brake BK2 are placed in the released states while the clutch CL2 and the brake BK1 are placed in the engaged states.

FIGS. 4-10 are the collinear charts having straight lines which permit indication thereon of the relative rotating speeds of the various rotary components of the drive system 10 (rotary elements of the first and second planetary gear sets 14 and 16), in respective different states of connection of the rotary elements corresponding to the respective different combinations of the operating states of the clutches CL1 and CL2 and the brakes BK1 and BK2. These collinear charts are defined in a two-dimensional coordinate system having a horizontal axis along which the relative gear ratios ρ of the first and second planetary gear sets 14 and 16 are taken, and a vertical axis along which the relative rotating speeds of the rotary elements are taken. The collinear charts indicate the relative rotating speeds when the output gear 28 is rotated in the positive direction to drive the hybrid vehicle in the forward direction. A horizontal line X1 represents the rotating speed of zero, while vertical lines Y1, Y2a, Y2b, Y3, Y4a and Y4b arranged in the order of description in the rightward direction represent the respective relative rotating speeds of the various rotary elements. Namely, a solid line Y1 represents the rotating speed of the ring gear R1 of the first planetary gear set 14 (first electric motor MG1), and a solid line Y2a represents the rotating speed of the carrier C1 of the first planetary gear set 14 (engine 12), while a broken line Y2b represents the rotating speed of the ring gear R2 of the second planetary gear set 16. A broken line Y3 represents the rotating speed of the carrier C2 of the second planetary gear set 16 (output gear 28), and a solid line Y4a represents the rotating speed of the sun gear S1 of the first planetary gear set 14, while a broken line Y4b represents the rotating speed of the sun gear S2 of the second planetary gear set 16 (second electric motor MG2). In FIGS. 4-10, the vertical lines Y2a and Y2b are superimposed on each other, while the vertical lines Y4a and Y4b are superimposed on each other. Since the sun gears S1 and S2 are connected to each other, the relative rotating speeds of the sun gears S1 and S2 represented by the vertical lines Y4a and Y4b are equal to each other.

In FIGS. 4-10, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2b-Y4b) are determined by the gear ratios ρ1 and ρ2 of the first and second planetary gear sets 14 and 16. Described more specifically, regarding the vertical lines Y1, Y2a and Y4a corresponding to the respective three rotary elements of the first planetary gear set 14, a distance between the vertical lines Y2a and Y4a respectively corresponding to the carrier C1 and the sun gear S1 corresponds to "1", while a distance between the vertical lines Y1 and Y2a respectively corresponding to the ring gear R1 and the carrier C1 corresponds to the gear ratio "ρ1". Regarding the vertical lines Y2b, Y3 and Y4b corresponding to the respective three rotary elements of the second planetary gear set 16, a distance between the vertical lines Y3 and Y4b respective corresponding to the carrier C2 and the sun gear S2 corresponds to "1", while a distance between the vertical lines Y2b and Y3 respectively corresponding to the ring gear R2 and the carrier C2 corresponds to the gear ratio "ρ2". The drive modes of the drive system 10 will be described by reference to FIGS. 4-10.

Figure 4:
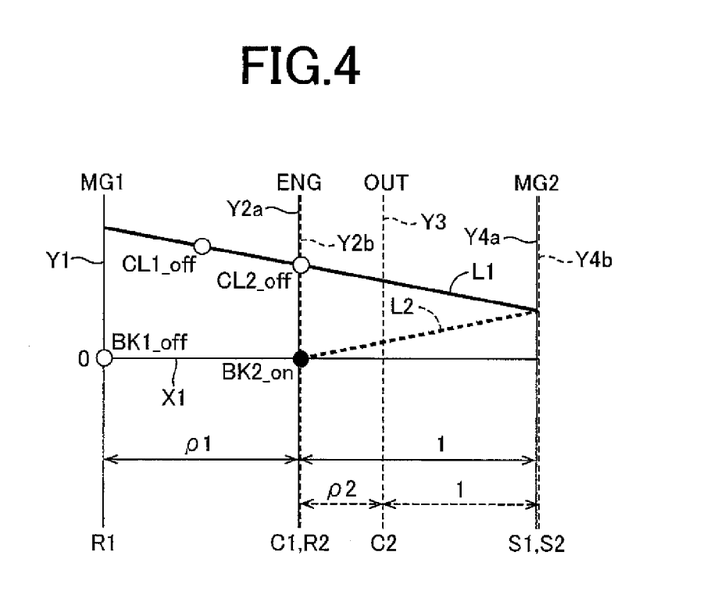
FIG. 4 is a collinear chart having straight lines which permit indication thereon of relative rotating speeds of various rotary elements of the drive system of FIG. 1, the collinear chart corresponding to drive modes HV1 and EV1 indicated in FIG. 3.

The collinear chart of FIG. 4 corresponds to the drive mode HV1 of the drive system 10, which is preferably the hybrid drive mode in which the engine 12 is used as the vehicle drive power source while the first and second electric motors MG1 and MG2 are operated as needed to generate a drive force and/or an electric energy. Described by reference to this collinear chart of FIG. 4, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are rotatable relative to each other in the released state of the clutch CL2. In the engaged state of the brake BK2, the ring gear R2 of the second planetary gear set 16 is connected to the stationary member in the form of the housing 26, so that the rotating speed of the ring gear R2 is held zero. In this drive mode HV1, the engine 12 is operated to generate an output torque by which the output gear 28 is rotated. At this time, the first electric motor MG1 is operated to generate a reaction torque in the first planetary gear set 14, so that the output of the engine 12 can be transmitted to the output gear 28. In the second planetary gear set 16, the carrier C2, that is, the output gear 28 is rotated in the positive direction by a positive torque (i.e., a torque acting in a positive direction) generated by the second electric motor MG2 in the engaged state of the brake BK2.

Figure 5:
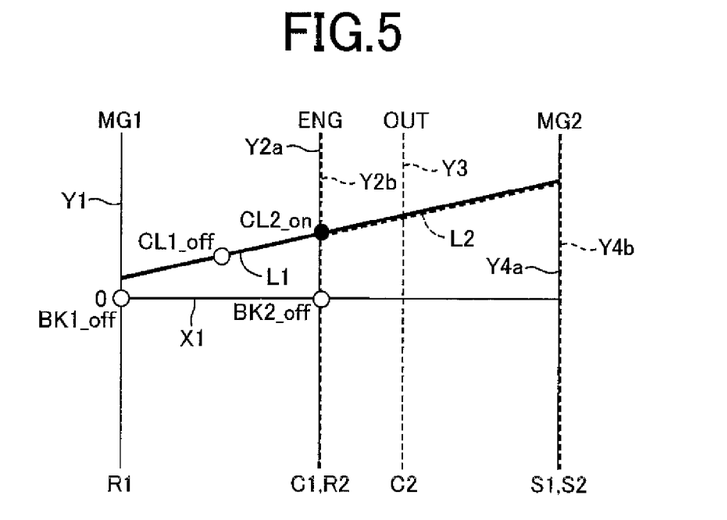
FIG. 5 is a collinear chart having straight lines which permit indication thereon of the relative rotating speeds of the rotary elements of the drive system of FIG. 1, the collinear chart corresponding to a drive mode HV2 indicated in FIG. 3.

The collinear chart of FIG. 5 corresponds to the drive mode HV2 of the drive system 10, which is preferably the hybrid drive mode in which the engine 12 is used as the vehicle drive power source while the first and second electric motors MG1 and MG2 are operated as needed to generate a vehicle drive force and/or an electric energy. Described by reference to this collinear chart of FIG. 5, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are not rotatable relative to each other, in the engaged state of the clutch CL2, that is, the carrier C1 and the ring gear R2 are integrally rotated as a single rotary component in the engaged state of the clutch CL2. The sun gears S1 and S2, which are connected to each other, are integrally rotated as a single rotary component. Namely, in the drive mode HV2 of the drive system 10, the first and second planetary gear sets 14 and 16 function as a differential device comprising a total of four rotary components. That is, the drive mode HV2 is a composite split mode in which the four rotary components are connected to each other in the order of description in the rightward direction as seen in FIG. 5. The four rotary components consist of: the ring gear R1 (connected to the first electric motor MG1); a rotary member consisting of the carrier C1 and the ring gear R2 connected to each other (and connected to the engine 12); the carrier C2 (connected to the output gear 28); and a rotary member consisting of the sun gears S1 and S2 connected to each other (and connected to the second electric motor MG2).

In the drive mode HV2, the carrier C1 of the first planetary gear set 14 and the ring gear R2 of the second planetary gear set 16 are connected to each other in the engaged state of the clutch CL2, so that the carrier C1 and the ring gear R2 are rotated integrally with each other. Accordingly, either one or both of the first and second electric motors MG1 and MG2 can receive a reaction force corresponding to the output of the engine 12. Namely, one or both of the first and second electric motors MG1 and MG2 can be operated to receive the reaction force during an operation of the engine 12, and each of the first and second electric motors MG1 and MG2 can be operated at an operating point assuring a relatively high degree of operating efficiency, and/or with a reduced degree of torque limitation due to heat generation.

The collinear chart of FIG. 4 also corresponds to the drive mode EV1 of the drive system 10, which is preferably the EV drive mode in which the engine 12 is held at rest while the second electric motor MG2 is used as the vehicle drive power source. Described by reference to this collinear chart of FIG. 4, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are rotatable relative to each other in the released state of the clutch CL2. Further, in the engaged state of the brake BK2, the ring gear R2 of the second planetary gear set 16 is connected to the stationary member in the form of the housing 26, so that the rotating speed of the ring gear R2 is held zero. In this drive mode EV1, the carrier C2, that is, the output gear 28 is rotated in the positive direction by a positive torque (i.e., a torque acting in a positive direction) generated by the second electric motor MG2 in the second planetary gear set 16. Namely, the hybrid vehicle provided with the drive system 10 can be driven in the forward direction with the positive torque generated by the second electric motor MG2. In this case, the first electric motor MG1 is preferably held in a free state.

Figure 6:
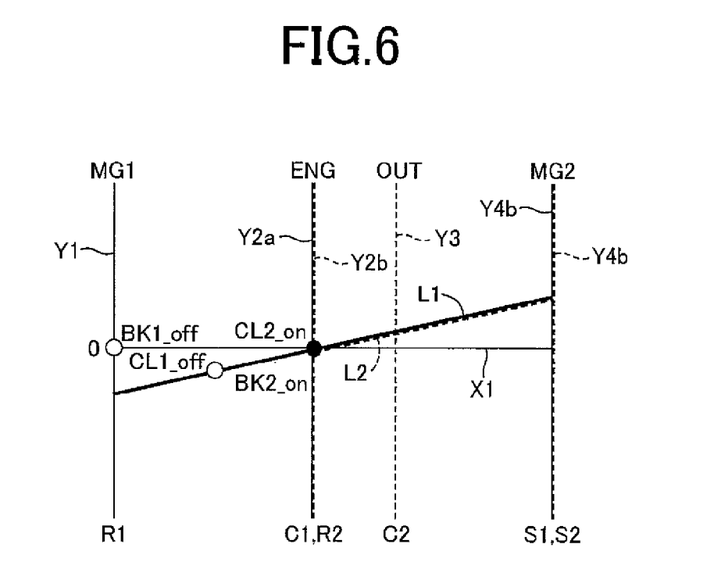
FIG. 6 is a collinear chart having straight lines which permit indication thereon of the relative rotating speeds of the rotary elements of the drive system of FIG. 1, the collinear chart corresponding to a drive mode EV2 indicated in FIG. 3.

The collinear chart of FIG. 6 corresponds to the drive mode EV2 of the drive system 10, which is preferably the EV drive mode in which the engine 12 is held at rest while at least one of the first and second electric motors MG1 and MG2 is used as the vehicle drive power source. Described by reference to this collinear chart of FIG. 6, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are not rotatable relative to each other in the engaged state of the clutch CL2. Further, in the engaged state of the brake BK2, the ring gear R2 of the second planetary gear set 16 and the carrier C1 of the first planetary gear set 14 which is connected to the ring gear R2, are connected to the stationary member in the form of the housing 26, so that the rotating speeds of the ring gear R2 and the carrier C1 are held zero. In this drive mode EV2, the rotating directions of the ring gear R1 and the sun gear S1 of the first planetary gear set 14 are opposite to each other. Namely, the carrier C2, that is, the output gear 28 is rotated in the positive direction by a negative torque (acting in the negative direction) generated by the first electric motor MG1, and/or a positive torque (acting in the positive direction) generated by the second electric motor MG2. That is, the hybrid vehicle provided with the drive system 10 can be driven in the forward direction when the torque is generated by at least one of the first and second electric motors MG1 and MG2.

In the drive mode EV2, at least one of the first and second electric motors MG1 and MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery 48. Namely, the drive mode EV2 can be established under various running conditions of the hybrid vehicle, or may be kept for a relatively long length of time. Accordingly, the drive mode EV2 is advantageously provided on a hybrid vehicle such as a plug-in hybrid vehicle, which is frequently placed in an EV drive mode.

The drive modes "$1^{st}$-speed" through "$4^{th}$-speed" indicated in FIG. 3 are the constant-speed-ratio drive modes which are established when the differential functions of the first and second planetary gear sets 14 and 16 are limited and in which the ratio of the output speed of the first or second planetary gear set 14, 16 to the speed of the rotary motion received from the engine 12 is held constant. In the drive modes "$1^{st}$-speed" through "$4^{th}$-speed", a first coupling element in the form of the clutch CL1 or the brake BK1 is placed in the engaged state to hold constant the ratio of the output speed of the first planetary gear set 14 to the speed of the rotary motion received from the engine 12.

Figure 7:
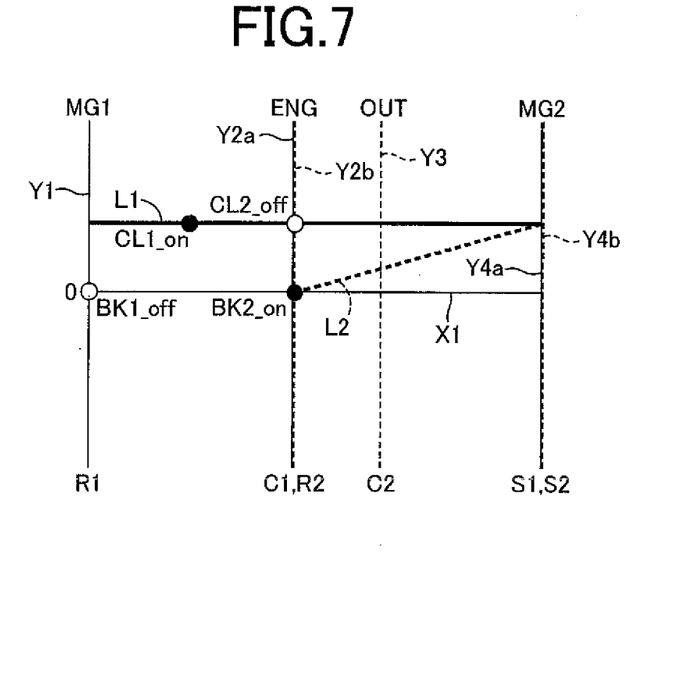
FIG. 7 is a collinear chart having straight lines which permit indication thereon of the relative rotating speeds of the rotary elements of the drive system of FIG. 1, the collinear chart corresponding to a drive mode "$1^{st}$-speed" indicated in FIG. 3.

The collinear chart of FIG. 7 corresponds to the drive mode "$1^{st}$-speed". Described more specifically by reference to this collinear chart of FIG. 7, the rotary elements of the first planetary gear set 14 are rotated as a single rotary unit in the engaged state of the clutch CL1. Namely, the operating speeds of the first electric motor MG1 connected to the ring gear R1, the engine 12 connected to the carrier C1 and the second electric motor MG2 connected to the sun gear S1 (sun gear S2) are equal to each other, so that the drive force received from the engine 12 is transmitted to the sun gear S2 of the second planetary gear set 16 through the first planetary gear set 14 the rotary elements of which are rotated as a single rotary unit. In the second planetary gear set 16, the ring gear R2 is connected to the housing 26 through the brake BK2 placed in the engaged state, so that the speed of the rotary motion of the engine 12 transmitted to the sun gear S2 is reduced by the second planetary gear set 16 before the rotary motion is transmitted from the carrier C2 to the output gear 28. In the drive mode "$1^{st}$-speed", the speed of the rotary motion of the engine 12 is changed at a constant ratio corresponding to this drive mode, before the rotary motion is transmitted to the output gear 28. Further, a drive force generated by at least one of the first and second electric motors MG1 and MG2 may be transmitted to the output gear 28.

Figure 8:
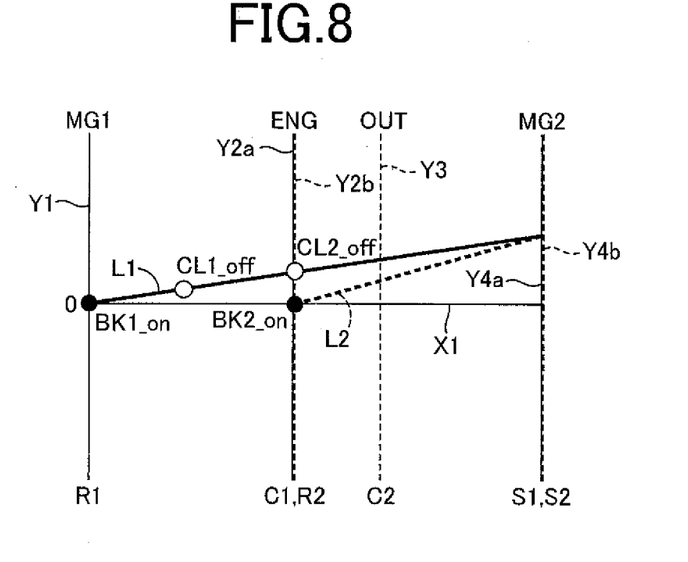
FIG. 8 is a collinear chart having straight lines which permit indication thereon of the relative rotating speeds of the rotary elements of the drive system of FIG. 1, the collinear chart corresponding to a drive mode "$2^{nd}$-speed" indicated in FIG. 3.

The collinear chart of FIG. 8 corresponds to the drive mode "$2^{nd}$-speed". Described more specifically by reference to this collinear chart of FIG. 8, the ring gear R1 of the first planetary gear set 14 is connected to the housing 26 through the brake BK1 placed in the engaged state, so that the speed of the rotary motion of the engine 12 transmitted to the carrier C1 is raised by the first planetary gear set 14 before the rotary motion is transmitted from the carrier C1 to the sun gear S2. In the second planetary gear set 16, the ring gear R2 is connected to the housing 26 through the brake BK2 placed in the engaged state, so that the speed of the rotary motion of the engine 12 transmitted to the sun gear S2 is reduced by the second planetary gear set 16 before the rotary motion is transmitted from the carrier C2 to the output gear 28. In the drive mode "$2^{nd}$-speed", the speed of the rotary motion of the engine 12 is changed at a constant ratio corresponding to this drive mode, before the rotary motion is transmitted to the output gear 28. Further, a drive force generated by the second electric motor MG2 may be transmitted to the output gear 28.

Figure 9:
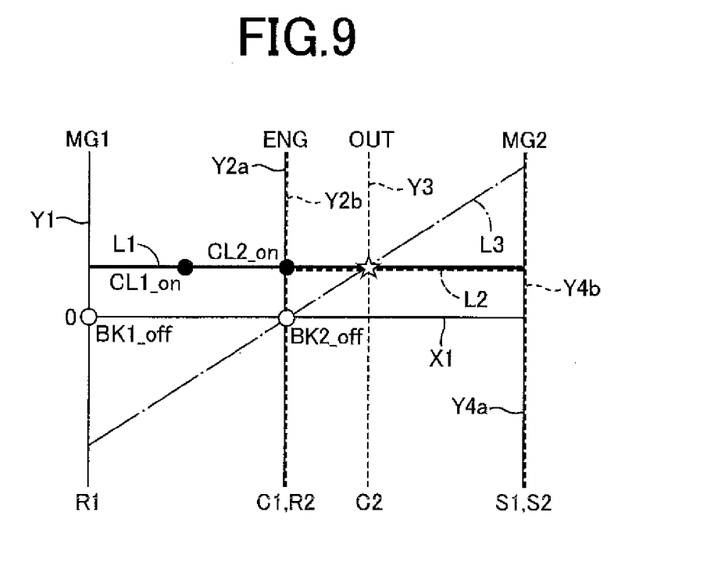
FIG. 9 is a collinear chart having straight lines which permit indication thereon of the relative rotating speeds of the rotary elements of the drive system of FIG. 1, the collinear chart corresponding to a drive mode "$3^{rd}$" indicated in FIG. 3.

The collinear chart of FIG. 9 corresponds to the drive mode "$3^{rd}$-speed". Described more specifically by reference to this collinear chart of FIG. 9, the rotary elements of the first planetary gear set 14 are rotated as a single rotary unit in the engaged state of the clutch CL1. Namely, the operating speeds of the first electric motor MG1 connected to the ring gear R1, the engine 12 connected to the carrier C1 and the second electric motor MG2 connected to the sun gear S1 (sun gear S2) are equal to each other. Further, the rotary elements of the first and second planetary gear sets 14 and 16 are rotated as a single rotary unit in the engaged state of the clutch CL2. Accordingly, the drive force of the engine 12 transmitted to the carrier C1 is transmitted from the carrier C2 to the output gear 28 through the first and second planetary gear sets 14 and 16 the rotary elements of which are rotated as the single rotary unit. In the drive mode "$3^{rd}$-speed", the speed of the rotary motion of the engine 12 is changed at a constant ratio (=1) corresponding to this drive mode, before the rotary motion is transmitted to the output gear 28. Further, a drive force generated by at least one of the first and second electric motors MG1 and MG2 may be transmitted to the output gear 28.

Figure 10:
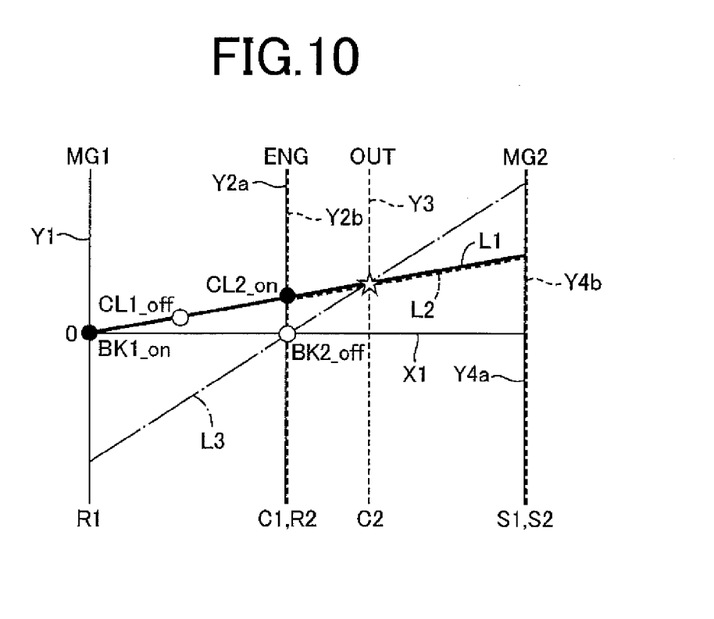
FIG. 10 is a collinear chart having straight lines which permit indication thereon of the relative rotating speeds of the rotary elements of the drive system of FIG. 1, the collinear chart corresponding to a drive mode "$4^{th}$-speed" indicated in FIG. 3.

The collinear chart of FIG. 10 corresponds to the drive mode "$4^{th}$-speed". Described more specifically by reference to this collinear chart of FIG. 10, the carrier C1 of the first planetary gear set 14 and the ring gear R2 of the second planetary gear set 16 are connected to each other through the clutch CL2 placed in the engaged state, so that the rotary elements of the first and second planetary gear sets 14 and 16 are rotated as a single rotary unit. Namely, the operating speeds of the carrier C1 and the ring gear R2 which are connected to each other, and the operating speed of the engine 12 are equal to each other. Further, the ring gear R1 of the first planetary gear set 14 is connected to the housing 26 through the brake BK1 placed in the engaged state, so that the speed of the rotary motion of the engine 12 transmitted to the carrier C1 and the ring gear R2 connected to each other is raised before the rotary motion is transmitted from the carrier C2 to the output gear 28. In the drive mode "$4^{th}$-speed", the speed of the rotary motion of the engine 12 is changed at a constant ratio corresponding to this drive mode, before the rotary motion is transmitted to the output gear 28. Further, a drive force generated by the second electric motor MG2 may be transmitted to the output gear 28.

In the drive modes "$1^{st}$-speed" to "$4^{th}$-speed", one of the clutch CL1 and the brake BK1 is placed in the engaged state, so that the differential functions of the first and second planetary gear sets 14 and 16 are limited, and the speed of the rotary motion of the engine 12 is changed at the predetermined constant ratio corresponding to an established one of the drive modes "$1^{st}$-speed" to "$4^{th}$-speed", before the rotary motion is transmitted to the output gear 28. In the released states of both of the clutch CL1 and the brake BK1, on the other hand, the differential functions of the first and second planetary gear sets 14 and 16 are permitted.

Figure 11:
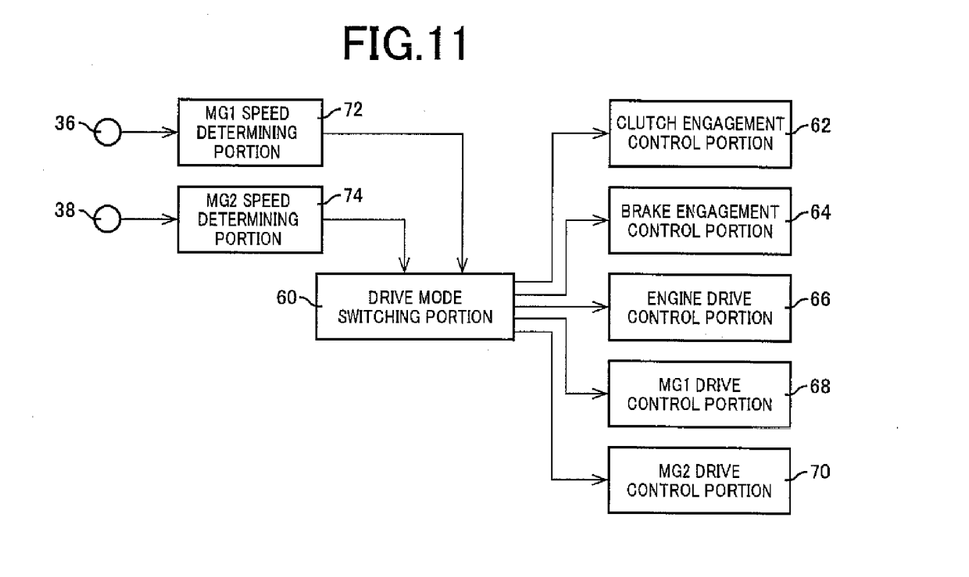
FIG. 11 is a functional block diagram illustrating major control functions of an electronic control device shown in FIG. 2.

FIG. 11 is the functional block diagram illustrating major control functions of the electronic control device 30. A drive mode switching portion 60 shown in FIG. 11 is configured to determine the drive mode of the drive system 10 that should be established. Described more specifically, the drive mode switching portion 60 selects one of the drive modes indicated in FIG. 3, on the basis of the accelerator pedal operation amount $A_{CC}$ detected by the accelerator pedal operation amount sensor 32, the vehicle running speed V corresponding to the output speed detected by the output speed sensor 40, the stored electric energy amount SOC of the battery 48 detected by the battery SOC sensor 42, etc., and according to a predetermined drive mode switching map. Namely, the drive mode switching portion 60 is basically configured to select one of the drive modes HV1, HV2, EV1, EV2, "$1^{st}$-speed", "$2^{nd}$-speed", "$3^{rd}$-speed" and "$4^{th}$-speed", on the basis of the accelerator pedal operation amount $A_{CC}$, the vehicle running speed V, the stored electric energy amount SOC of the battery 48, etc., and according to the drive mode switching map.

A clutch engagement control portion 62 is configured to control the operating states of the clutches CL1 and CL2 through the hydraulic control unit 54. Described more specifically, the clutch engagement control portion 62 controls output hydraulic pressures of solenoid control valves provided in the hydraulic control unit 54 to control the clutches CL1 and CL2, for controlling the hydraulic pressures $P_{CL1}$ and $P_{CL2}$ which determine the operating states (torque capacities) of the clutches CL1 and CL2. The clutch engagement control portion 62 is preferably configured to control the operating states of the clutches CL1 and CL2, according to the drive mode selected by the drive mode switching portion 60. Namely, the clutch engagement control portion 62 is basically configured to control the torque capacity of the clutch CL1, so as to place the clutch CL1 in the engaged state when the drive mode switching portion 60 has determined that the drive system 10 should be switched to the drive mode "$1^{st}$-speed" or "$3^{rd}$-speed", and so as to place the clutch CL1 in the released state when the drive mode switching portion 60 has determined that the drive system 10 should be switched to the drive mode HV1, HV2, EV1, EV2, "$2^{nd}$-speed" or "$4^{th}$-speed". Further, the clutch engagement control portion 62 controls the torque capacity of the clutch CL2 so as to place the clutch CL2 in the engaged state when the drive mode switching portion 60 has determined that the drive system 10 should be switched to the drive mode HV2, EV2, "$3^{rd}$-speed" or "$4^{th}$-speed", and so as to place the clutch CL2 in the released state when the drive mode switching portion 60 has determined that the drive system 10 should be switched to the drive mode HV1, EV1, "$1^{st}$-speed" or "$2^{nd}$-speed".

A brake engagement control portion 64 is configured to control the operating state of the brakes BK1 and BK2 through the hydraulic control unit 54. Described more specifically, the brake engagement control portion 64 controls output hydraulic pressures of solenoid control valves provided in the hydraulic control unit 54 to control the brakes BK1 and BK2, for controlling the hydraulic pressures $P_{BK1}$ and $P_{BK2}$ which determine the operating states (torque capacities) of the brakes BK1 and BK2. The brake engagement control portion 64 is preferably configured to control the operating states of the brakes BK1 and BK2, according to the drive mode selected by the drive mode switching portion 60. Namely, the brake engagement control portion 64 is basically configured to control the torque capacity of the brake BK1, so as to place the brake BK1 in the engaged state when the drive mode switching portion 60 has determined that the drive system 10 should be switched to the drive mode "$2^{nd}$-speed" or "$4^{th}$-speed", and so as to place the brake BK1 in the released state when the drive mode switching portion 60 has determined that the drive system 10 should be switched to the drive mode HV1, HV2, EV1, EV2, "$1^{st}$-speed" or "$3^{rd}$-speed". Further, the brake engagement control portion 64 controls the torque capacity of the brake BK2 so as to place the brake BK2 in the engaged state when the drive mode switching portion 60 has determined that the drive system 10 should be switched to the drive mode HV1, EV1, EV2, "$1^{st}$-speed" or "$2^{nd}$-speed", and so as to place the brake BK2 in the released state when the drive mode switching portion 60 has determined that the drive system 10 should be switched to the drive mode HV2, "$3^{rd}$-speed" or "$4^{th}$-speed".

An engine drive control portion 66 is configured to control an operation of the engine 12 through the engine control device 52. For instance, the engine drive control portion 66 commands the engine control device 52 to control an amount of supply of a fuel by the fuel injecting device of the engine 12 into an intake pipe, a timing of ignition (ignition timing) of the engine 12 by the igniting device, and the opening angle $\theta_{TH}$ of the electronic throttle valve, so that the engine 12 generates a required output, that is, a target torque (target engine output).

An MG1 drive control portion 68 is configured to control an operation of the first electric motor MG1 through the inverter 50. For example, the MG1 drive control portion 68 controls an amount of an electric energy to be supplied from the battery 48 to the first electric motor MG1 through the inverter 50, so that the first electric motor MG1 generates a required output, that is, a target torque (target MG1 output). An MG2 drive control portion 70 is configured to control an operation of the second electric motor MG2 through the inverter 50. For example, the MG2 drive control portion 70 controls an amount of an electric energy to be supplied from the battery 48 to the second electric motor MG2 through the inverter 50, so that the second electric motor MG2 generates a required output, that is, a target torque (target MG2 output).

In the hybrid drive modes in which the engine 12 is operated while the first and second electric motors MG1 and MG2 are used as the vehicle drive power source, a required vehicle drive force to be generated by the drive system 10 (output gear 28) is calculated on the basis of the accelerator pedal operation amount $A_{CC}$ detected by the accelerator pedal operation amount sensor 32, and the vehicle running speed V corresponding to the output speed $N_{OUT}$ detected by the output speed sensor 40. The operations of the first and second electric motors MG1 and MG2 are controlled by the MG1 and MG2 drive control portions 68 and 70, while the operation of the engine 12 is controlled by the engine drive control portion 66, so that the calculated required vehicle drive force is obtained by the output torque of the engine 12 and the output torques of the first and second electric motors MG1 and MG2.

An MG1 speed determining portion 72 is configured to determine whether the operating speed $N_{MG1}$ of the first electric motor MG1 has been raised to a predetermined threshold value. Preferably, the MG1 speed determining portion 72 determines whether the operating speed $N_{MG1}$ of the first electric motor MG1 detected by the MG1 speed sensor 36 is equal to or higher than a predefined upper limit $N_{MG1\_max}$. This upper limit $N_{MG1\_max}$ is an upper limit value of the operating speed $N_{MG1}$ which is determined by the specifications of the first electric motor MG1 and above which the first electric motor MG1 has a risk of deterioration of its durability. Accordingly, the MG1 speed determining portion 72 prevents an excessive rise of the operating speed $N_{MG1}$ of the first electric motor MG1 to or above the upper limit $N_{MG1\_max}$. While this upper limit $N_{MG1\_max}$ may be a constant value, it is preferable to change the upper limit $N_{MG1\_max}$ on the basis of the output torque of the first electric motor MG1 and according to a predetermined relationship between the upper limit $N_{MG1\_max}$ and the output torque.

An MG2 speed determining portion 74 is configured to determine whether the operating speed $N_{MG2}$ of the second electric motor MG2 has been raised to a predetermined threshold value. Preferably, the MG2 speed determining portion 74 determines whether the operating speed $N_{MG2}$ of the second electric motor MG2 detected by the MG2 speed sensor 38 is equal to or higher than a predefined upper limit $N_{MG2\_max}$. This upper limit $N_{MG2}$ max is an upper limit value of the operating speed $N_{MG2}$ which is determined by the specifications of the second electric motor MG2 and above which the second electric motor MG2 has a risk of deterioration of its durability. Accordingly, the MG2 speed determining portion 74 prevents an excessive rise of the operating speed $N_{MG2}$ of the second electric motor MG2 to or above the upper limit $N_{MG2\_max}$. While this upper limit $N_{MG2\_max}$ may be a constant value, it is preferable to change the upper limit $N_{MG2\_max}$ on the basis of the output torque of the second electric motor MG2 and according to a predetermined relationship between the upper limit $N_{MG2\_max}$ and the output torque.

When the operating speed of the first electric motor MG1 or the second electric motor MG2 has been raised to the predetermined threshold value during running of the hybrid vehicle in one of the drive modes in which at least one of the first and second electric motors MG1 and MG2 is operated as the vehicle chive power source while the crankshaft 12a of the engine 12 is connected to the housing 26, the drive mode switching portion 60 brings the clutch CL1 or the brake BK1 into the engaged state, and establishes one of the drive modes in which at least one of the first and second electric motors MG1 and MG2 is operated as the vehicle drive power source while the ratio of the output speed of the first planetary gear set 14 to the speed of the rotary motion received from the engine 12 is held constant. Namely, when the affirmative determination is obtained by at least one of the MG1 speed determining portion 72 and the MG2 speed determining portion 74 during running of the hybrid vehicle while the drive system 10 is placed in the EV drive mode EV2 of FIG. 3, the drive mode switching portion 60 establishes one of the constant-speed-ratio drive modes "$1^{st}$-speed" through "$4^{th}$-speed", and maintains the EV running of the hybrid vehicle with the first electric motor MG1 or the second electric motor MG2 being operated as the vehicle drive power source. Preferably, the drive mode switching portion 60 establishes the constant-speed-ratio drive mode "$3^{rd}$-speed" or "$4^{th}$-speed" and maintains the EV running with the drive force generated by at least one of the first and second electric motors MG1 and MG2. In this case, the engine 12 is preferably placed in the free state.

In the collinear chart of FIG. 9, a thin one-dot chain line L3 indicates the relative rotating speeds of the three rotary elements of the first planetary gear set 14 and the three rotary elements of the second planetary gear set 16 when the drive system 10 is placed in the EV drive mode EV2, while straight lines L1 and L2 indicate the rotary speeds of the various rotary elements of the drive system 10 while the constant-speed-ratio drive mode "$3^{rd}$-speed". Namely, the straight lines L1 and L2, and the one-dot chain line L3 respectively represent the rotating speeds of the rotary elements while the drive system 10 is placed in the drive mode "$3^{rd}$-speed" and those while the chive system 10 is placed in the EV drive mode EV2, when the output gear 28 of the drive system 10 has the rotating speed indicated by an asterisk mark lying on the vertical line Y3 which represents the rotating speed of the output gear 28. It will be understood from the collinear chart of FIG. 9 that the desired output speed $N_{OUT}$ of the drive system 10 indicated by the asterisk mark lying on the vertical line Y3 is established at the lower operating speeds $N_{MG1}$ and $N_{MG2}$ of the first and second electric motors MG1 and MG2 in the constant-speed-ratio drive mode "$3^{rd}$-speed", than in the EV drive mode EV2. In other words, the operating speeds $N_{MG1}$ and $N_{MG2}$ of the first and second electric motors MG1 and MG2 required to establish the desired output speed $N_{OUT}$ can be lowered in the constant-speed-ratio drive mode "$3^{rd}$-speed", as compared with those in the EV drive mode EV2. Accordingly, it is possible to reduce amounts of rise of the operating speeds $N_{MG1}$ and $N_{MG2}$ of the first and second electric motors MG1 and MG2 with a rise of the output speed $N_{OUT}$, and to permit sufficient utilization of the electric energy stored in the battery 48, by switching the drive system 10 to the constant-speed-ratio drive mode "$3^{rd}$-speed" where it is desired to positively use the electric energy of the battery 48 (i.e., where it is desired to positively use the first and second electric motors MG1 and MG2 to generate drive force) when the stored electric energy amount of the battery 48 is sufficiently large.

In the constant-speed-ratio drive mode "$3^{rd}$-speed", both of the first and second electric motors MG1 and MG2 can be used as the vehicle drive power source, as described above. In this respect, it is desirable to switch the drive system 10 to the drive mode "$3^{rd}$-speed" where the drive system 10 is required to produce a relatively large vehicle drive force. For this reason, the drive mode switching portion 60 is preferably configured to command the brake engagement control portion 64 to bring the brake BK2 into the released state and to command the clutch engagement control portion 62 to bring the clutch CL1 into the engaged state for switching the drive system 10 from the EV drive mode EV2 to the constant-speed-ratio drive mode "$3^{rd}$-speed", when the required vehicle drive force is equal to or larger than a predetermined threshold value while the affirmative determination is obtained by at least one of the MG1 and MG2 speed determining portions 72 and 74 during running of the hybrid vehicle in the EV drive mode EV2.

In the collinear chart of FIG. 10, a thin one-dot chain line L3 indicates the relative rotating speeds of the three rotary elements of the first planetary gear set 14 and the three rotary elements of the second planetary gear set 16 when the chive system 10 is placed in the EV drive mode EV2, as in the collinear chart of FIG. 9, while the straight lines L1 and L2 indicate the rotary speeds of the various rotary elements of the drive system 10 while the constant-speed-ratio chive mode "$4^{th}$-speed". Namely, the straight lines L1 and L2, and the one-dot chain line L3 respectively represent the rotating speeds of the rotary elements while the drive system 10 is placed in the drive mode "$4^{th}$-speed" and those while the drive system 10 is placed in the EV drive mode EV2, when the output gear 28 of the drive system 10 has the rotating speed indicated by an asterisk mark lying on the vertical line Y3 which represents the rotating speed of the output gear 28. It will be understood from the collinear chart of FIG. 10 that the desired output speed $N_{OUT}$ of the drive system 10 indicated by the asterisk mark lying on the vertical line Y3 is established at the lower operating speed $N_{MG2}$ of the second electric motor MG2 in the constant-speed-ratio drive mode "$4^{th}$-speed", than in the EV drive mode EV2. In other words, the operating speed $N_{MG2}$ of the second electric motor MG2 required to establish the desired output speed $N_{OUT}$ can be lowered in the constant-speed-ratio drive mode "$4^{th}$-speed", as compared with those in the EV drive mode EV2. Accordingly, it is possible to reduce an amount of rise of the operating speed $N_{MG2}$ of the second electric motor MG2 with a rise of the output speed $N_{OUT}$, and to permit sufficient utilization of the electric energy stored in the battery 48, by switching the drive system 10 to the constant-speed-ratio chive mode "$4^{th}$-speed" where it is desired to positively use the electric energy of the battery 48 (i.e., where it is desired to positively use the second electric motor MG2 to generate drive force) when the stored electric energy amount of the battery 48 is sufficiently large.

Although the first electric motor MG1 cannot be used as the vehicle drive power source in the constant-speed-ratio drive mode "$4^{th}$-speed" in which the brake BK1 is placed in the engaged state, the second electric motor MG2 can be used as the vehicle drive power source. Further, since the drive system 10 has a lower speed ratio in the drive mode "$4^{th}$-speed" than in the drive mode "$3^{rd}$-speed", it is desirable to switch the drive system 10 to the drive mode "$4^{th}$-speed" where the drive system 10 is required to be operated at a comparatively high output speed $N_{OUT}$ with a comparatively low load. For this reason, the drive mode switching portion 60 is preferably configured to command the brake engagement control portion 64 to bring the brake BK2 into the released state and to bring the brake BK1 into the engaged state for switching the drive system 10 from the EV drive mode EV2 to the constant-speed-ratio drive mode "$4^{th}$-speed", when the required vehicle drive force is smaller than the predetermined threshold value and when the required value of the output speed $N_{OUT}$ is equal to or higher than a predetermined threshold value while the affirmative determination is obtained by at least one of the MG1 and MG2 speed determining portions 72 and 74 during running of the hybrid vehicle in the EV drive mode EV2.

The drive mode switching portion 60 may be configured to command the clutch engagement control portion 62 to bring the clutch CL2 into the released state and to bring the clutch CL1 into the engaged state, for switching the drive system 10 to the constant-speed-ratio drive mode "$1^{st}$-speed" when the affirmative determination is obtained by at least one of the MG1 and MG2 speed determining portions 72 and 74 during running of the hybrid vehicle in the EV drive mode EV2. In the drive mode "$1^{st}$-speed", both of the first and second electric motors MG1 and MG2 can be used as the vehicle drive power source. Although the operating speed $N_{MG2}$ of the second electric motor MG2 required to establish the desired output speed $N_{OUT}$ in the drive mode "$1^{st}$-speed" is equal to that in the drive mode EV2, the required operating speed $N_{MG1}$ of the first electric motor MG1 in the drive mode "$1^{st}$-speed" can be lowered as compared with that in the drive mode EV2, depending upon the specific gear ratio of the drive system 10. In particular, the drive system 10 is preferably switched to the drive mode "$1^{st}$-speed" where the drive system 10 is required to produce a relatively large vehicle drive force at a relatively low vehicle running speed.

Figure 12:
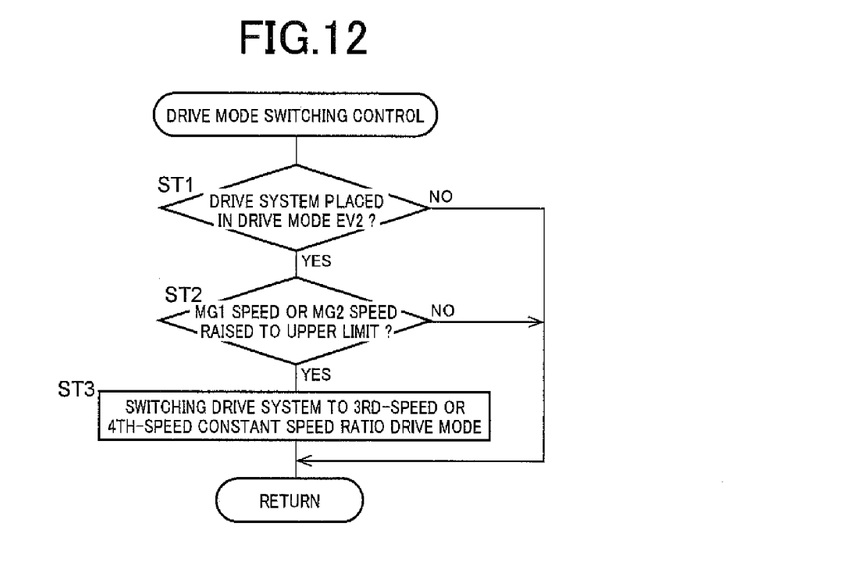
FIG. 12 is a flow chart illustrating a major portion of one example of a drive mode switching control in the present embodiment implemented by the electronic control device shown in FIG. 2.

FIG. 12 is the flow chart illustrating a major portion of one example of the drive mode switching control in the present embodiment implemented by the electronic control device 30. This drive mode switching control is implemented with a predetermined cycle time.

The drive mode switching control is initiated with step ST1, to determine whether the drive system 10 is placed in the EV drive mode EV2 in which the vehicle drive force is generated by at least one of the first and second electric motors MG1 and MG2 while the crankshaft 12a of the engine 12 is connected to the housing 26. If a negative determination is obtained in the step ST1, the present routine is terminated. If an affirmative determination is obtained in the step ST1, the control flow goes to step ST2 to determine whether the operating speed $N_{MG1}$ of the first electric motor MG1 detected by the MG1 speed sensor 36 or the operating speed $N_{MG2}$ of the second electric motor MG2 detected by the MG2 speed sensor 38 has been raised to the predetermined upper limit $N_{MG1\_max}$ or the predetermined upper limit $N_{MG2\_max}$. If a negative determination is obtained in the step ST2, the present routine is terminated. If an affirmative determination is obtained in the step ST2, the control flow goes to step ST3 to bring the clutch CL1 or the brake BK1 into the engaged state, for establishing the constant-speed-ratio drive mode "$3^{rd}$-speed" or "$4^{th}$-speed" in which the vehicle drive force is generated by at least one of the first and second electric motors MG1 and MG2 while the ratio of the output speed of the drive system 10 to the speed of the rotary motion received from the engine 12 is held constant. Then, the present routine is terminated. It will be understood that the steps ST1 and ST3 correspond to an operation of the drive mode switching portion 60, and the step ST2 corresponds to operations of the MG1 and MG2 speed determining portions 72 and 74, while the step ST3 corresponds to operations of the clutch and brake engagement control portions 62 and 64. The drive mode EV2 corresponds to the first drive mode, and the drive mode "$3^{rd}$-speed" or "$4^{th}$-speed" corresponds to the second drive mode.

The control apparatus in the form of the electronic control device 30 according to the illustrated embodiment of the invention is provided to control the hybrid vehicle drive system 10 including: the differential device which comprises a first differential mechanism in the form of the first planetary gear set 14 and a second differential mechanism in the form of the second planetary gear set 16 and which comprises the four rotary components (the rotating speeds of which are represented by a collinear chart); the engine 12, the first electric motor MG1, the second electric motor MG2 and an output rotary member in the form of the output gear 28 which are respectively connected to the four rotary components; and a coupling element in the form of the clutch CL1 or the brake BK1 which is placed in the engaged state to hold constant the ratio of the output speed of the first or second planetary gear set 14, 16 to the speed of the rotary motion received from the engine 12. The control apparatus comprises the drive mode switching portion 60 configured to bring the coupling element into the engaged state, for switching the drive system 10 from the EV drive mode in which the drive force to drive the hybrid vehicle is generated by at least one of the first and second electric motors MG1 and MG2 while the output shaft of the engine 12 in the form of the crankshaft 12a is connected to the stationary member in the form of the housing 26, to the constant-speed-ratio drive mode in which the drive force to drive the hybrid vehicle is generated by at least one of the first and second electric motors MG1 and MG2 while the ratio of the output speed of the first or second planetary gear set 14, 16 to the speed of the rotary motion received from the engine 12 is held constant, when the operating speed $N_{MG1}$ of the first electric motor MG1 or the operating speed $N_{MG2}$ of the second electric motor MG2 has been raised to the predetermined threshold value in the EV drive mode. Accordingly, the coupling element is brought into the engaged state to switch the drive system 10 to the constant-speed-ratio drive mode when the operating speed $N_{MG1}$ or $N_{MG2}$ of the first or second electric motor MG1, MG2 has been raised to the threshold value or upper limit while the amount of the electric energy stored in the battery 48 is sufficiently large. Therefore, the desired output speed $N_{OUT}$ of the drive system 10 can be established at a relatively low value of the operating speed $N_{MG1}$, $N_{MG2}$ of the first or second electric motor MG1, MG2, so that the electric energy stored in the battery 48 can be sufficiently utilized. In particular, the present control apparatus is effectively used for controlling the drive system 10 which is provided on a so-called "plug-in hybrid vehicle". Namely, the illustrated embodiment provides a control apparatus in the form of the electronic control device 30 for a hybrid vehicle drive system, which control apparatus permits sufficient utilization of the electric energy stored in the battery 48.

The first differential mechanism in the form of the first planetary gear set 14 comprises the first rotary element in the form of the ring gear R1 connected to the first electric motor MG1, the second rotary element in the form of the carrier C1 connected to the engine 12, and the third rotary element in the form of the sun gear S1, while the second differential mechanism in the form of the second planetary gear set 16 comprises the first rotary element in the form of the ring gear R2, the second rotary element in the form of the carrier C2 and the third rotary element in the form of the sun gear S2. The sun gear S1 of the first planetary gear set 14 and the sun gear S2 of the second planetary gear set 16 are connected to each other, and the carrier C2 of the second planetary gear set 16 is connected to the output rotary member in the form of the output gear 28, while the sun gear S2 of the second planetary gear set 16 is connected to the second electric motor MG2. Accordingly, it is possible to sufficiently utilize the electric energy stored in the battery 48 in the drive system 10 which has a practical arrangement.

The drive system 10 is provided with the coupling element in the form of the clutch CL1 configured to selectively connect the ring gear R1 and the carrier C1 of the first planetary gear set 14 to each other, or in the form of the brake BK1 configured to selectively connect the ring gear R1 of the first planetary gear set 14 to the housing 26. Accordingly, it is possible to sufficiently utilize the electric energy stored in the battery 48 in the hybrid vehicle drive system 10 which has a practical arrangement.

While the preferred embodiment of this invention has been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

10: Hybrid vehicle drive system
12: Engine
12a: Crankshaft (Output shaft)
14: First planetary gear set (First differential mechanism)
16: Second planetary gear set (Second differential mechanism)
26: Housing (Stationary member)
28: Output gear (Output rotary member)
30: Electronic control device
BK1: Brake (Coupling element)
C1: Carrier (Second rotary element)
C2: Carrier (Second rotary element)

CL1: Clutch (Coupling element)
MG1: First electric motor
MG2: Second electric motor
R1: Ring gear (First rotary element)
R2: Ring gear (First rotary element)
S1: Sun gear (Third rotary element)
S2: Sun gear (Third rotary element)

The invention claimed is:

1. A control apparatus for a drive system of a hybrid vehicle, the drive system including:
    a differential device including a first differential mechanism and a second differential mechanism, each of the first differential mechanism and the second differential mechanism having a plurality of rotary elements;
    an engine, a first electric motor, a second electric motor and an output rotary member; and
    a coupling element which is placed in an engaged state to hold constant a ratio of an output speed of the first differential mechanism or the second differential mechanism to a speed of a rotary motion received from the engine, the coupling element being placed in the engaged state so that the plurality of rotary elements of the first differential mechanism and the plurality of rotary elements of the second differential mechanism are four rotary components constituting the first differential device, the engine, the first electric motor, the second electric motor and the output rotary member are respectively connected to the four rotary components,
    the control apparatus comprising:
    an electronic control unit programmed to switch the hybrid vehicle drive system from: (i) a first drive mode, in which a drive force to drive the hybrid vehicle is generated by at least one of the first electric motor and the second electric motor when and output shaft of the engine is fixed to a stationary member of the hybrid vehicle, to (ii) a second drive mode, in which the ratio of the output speed of the first differential mechanism to the speed of the rotary motion received from the engine is constant by at least bringing the coupling element into the engaged state, the drive force to drive the hybrid vehicle is generated by at least one of the first electric motor and the second electric motor in the second drive mode, the electronic control unit being programmed to switch the hybrid vehicle drive system from the first drive mode to the second drive mode when an operating speed of the first electric motor or the second electric motor is at or greater than a predetermined threshold value in the first drive mode.

2. The control apparatus according to claim 1, wherein:
    the first differential mechanism includes: (i) a first rotary element directly connected to the first electric motor, (ii) a second rotary element connected to the engine, and (iii) a third rotary element;
    the second differential mechanism includes a first rotary element, a second rotary element and a third rotary element; and
    the third rotary element of the first differential mechanism and the third rotary element of the second differential mechanism are directly connected to each other, the second rotary element of the second differential mechanism is directly connected to the output rotary member, and the third rotary element of the second differential mechanism is directly connected to the second electric motor.

3. The control apparatus according to claim 2, wherein the coupling element is one of:
    a clutch configured to selectively connect the first rotary element and the second rotary element of the first differential mechanism to each other, and
    a brake configured to selectively connect the first rotary element of the first differential mechanism to the stationary member.

4. The control apparatus according to claim 2, wherein the connection between the second rotary element and the engine is either direct connection or selective connection.

5. The control apparatus according to claim 1, wherein in the second drive mode, the generated drive force to drive the hybrid vehicle is generated only by at least one of the first electric motor and the second electric motor.

* * * * *